United States Patent [19]

Husa

[11] 4,437,480

[45] Mar. 20, 1984

[54] MECHANISM FOR TIGHTENING AND REINFORCING THE JOINT OF A FOLDING STRUCTURE

[76] Inventor: Emmett O. Husa, 1614 N.W. 85th, Seattle, Wash. 98117

[21] Appl. No.: 396,155

[22] Filed: Jul. 8, 1982

[51] Int. Cl.[3] ........................ A61H 3/02; F16C 11/10

[52] U.S. Cl. ........................................ 135/74; 403/100

[58] Field of Search ...................... 135/69, 74, DIG. 9, 135/25 R, 25 A; 403/100, 102, 341, 342

[56] References Cited

U.S. PATENT DOCUMENTS

| | | | |
|---|---|---|---|
| 39,854 | 9/1803 | Wemple | 135/68 |
| 595,637 | 12/1897 | Kuhnke | 135/68 |
| 905,687 | 12/1908 | Gaskill | 135/74 |
| 1,068,564 | 7/1913 | Carrington et al. | 135/74 |
| 1,233,020 | 7/1917 | Beehler | 403/100 X |
| 1,311,145 | 7/1919 | Zeindler et al. | 403/102 X |
| 1,334,208 | 3/1920 | Ames | 135/68 |
| 2,426,074 | 8/1947 | Watters | 135/69 |
| 2,484,406 | 10/1949 | Gibson | 135/68 |
| 2,707,477 | 5/1955 | Chapin | 136/68 |
| 3,239,255 | 3/1966 | Murcott . | |
| 3,492,999 | 2/1970 | Boyd | 135/68 |
| 3,655,297 | 4/1972 | Bolen et al. | 135/74 |
| 3,886,962 | 6/1975 | Diamontis | 135/74 |
| 4,253,478 | 3/1981 | Husa | 135/68 |

FOREIGN PATENT DOCUMENTS

| | | | |
|---|---|---|---|
| 126298 | 1/1932 | Austria | 135/68 |
| 10171 | of 0000 | France | 135/74 |
| 365779 | 7/1906 | France | 403/100 |
| 16500 | 11/1912 | France | 403/100 |
| 1460103 | 10/1966 | France | 403/100 |
| 1835 | of 1897 | United Kingdom | 403/100 |
| 17593 | of 1897 | United Kingdom | 403/100 |
| 187372 | 10/1922 | United Kingdom | 403/100 |

*Primary Examiner*—Robert A. Hafer
*Assistant Examiner*—Arnold W. Kramer
*Attorney, Agent, or Firm*—Delbert J. Barnard

[57] ABSTRACT

Two sections of a structure are telescopically movable together and apart. When they are apart, the sections can be folded. When they are together, the ends of the section abut one another and transmit forces. A tubular end portion of one section slides into an annular space that is defined between a wall portion of the second section and a ring of collet jaws which surround such wall portion. A cam ring that is slidable on the second section is screw connected to a collet member of which the collet jaws are a part. Tightening of the cam ring causes a cam surface which it carries to apply laterally inwardly directed forces on the collet jaws, forcing them into tight squeezing contact with the tubular end portion of the second section.

3 Claims, 11 Drawing Figures

14
16
24
22
36
54
32
42
40
34

54
32
58
52
50
48
56
44
46
76
70
80
66
64
78
82
74
42
40
34

MECHANISM FOR TIGHTENING AND REINFORCING THE JOINT OF A FOLDING STRUCTURE

DESCRIPTION

1. Technical Field

This invention relates to folding structures, such as folding crutches, or the like, and more particularly to the provision of a mechanism for tightening and structurally reinforcing the joint at which folding occurs, while the structure is in its use position.

2. Background Art

The mechanism of the present invention for tightening and structurally reinforcing a folding joint of a folding structure is a very beneficial addition to the folding crutch that is covered by my U.S. Pat. No. 4,253,478, granted Mar. 3, 1981.

DISCLOSURE OF THE INVENTION

Folding structures with which the joint tightening and reinforcing mechanism of the present invention can be used are basically characterized by first and second sections, each including an end portion, at least one of which is tubular. The sections are connected together by a connector means which is adapted to permit the sections to be moved between a first position in which the two sections are generally aligned with each other and a folded position in which each section is adjacent the other section. The connector means comprises a first end piece connected to the end portion of the first section and a second end piece which is telescopically received with a tubular end portion of the second section. A link is positioned between the first and second end pieces. Its ends are pivotally connected to the end pieces by pivot pin means, enabling the end pieces, and the first and second sections connected thereto, to be pivotally moved between a first position in which they are axially aligned with the link and a second position in which they are both substantially perpendicular to the link and adjacent one another. The structure includes stop means for preventing telescopic movement of the second end piece completely outfrom the tubular end portion of the second section. A releasable lock means is carried by the second end piece and is engageable with the tubular end portion of the second section for locking the two sections together in the structures use position. The lock means includes a depressible lock button which unlocks the lock means when depressed and permits telescopic movement.

In accordance with the present invention, the joint tightening and reinforcing mechanism comprises a collet member which is attached to the end portion of the first section. It includes a plurality of collet jaws which extend axially endwise beyond the end of the end portion of the first section. The collet member also includes internal threads spaced axially inwardly of the collet jaws. A cam ring is slidably mounted on the tubular end portion of the second section. It includes an internally threaded end portion which is adapted for mating engagement with the external threads on the collet member. It also includes an internal cam portion spaced axially inwardly of the threaded portion. When the two sections are telescopically together and axially aligned, and the cam ring is screwed onto the collet member, its cam section exerts a radially inwardly directed squeezing force on the collet jaws. This brings the collet jaws into tight frictional engagement with the tubular end portion of the upper section. This causes the joint to be both structurally reinforced and tightened.

According to another aspect of the invention, the folding structure is a part of a folding crutch and is located between upper and lower sections of a crutch leg or stile. The weight of the user is transmitted by the connector means from the lower end of the tubular upper portion of the third stile directly to the upper end of the lower portion of the third stile. No portion of this weight is carried by hinge pins, lock pins or the like. This is a quite important feature and adds considerably to the life of the crutch.

Additional features, objects and advantages of the folding crutch of the present invention are described below in the description of the best mode.

BEST MODE FOR CARRYING OUT THE INVENTION

Figures 1, 2, 3, 4, 5:
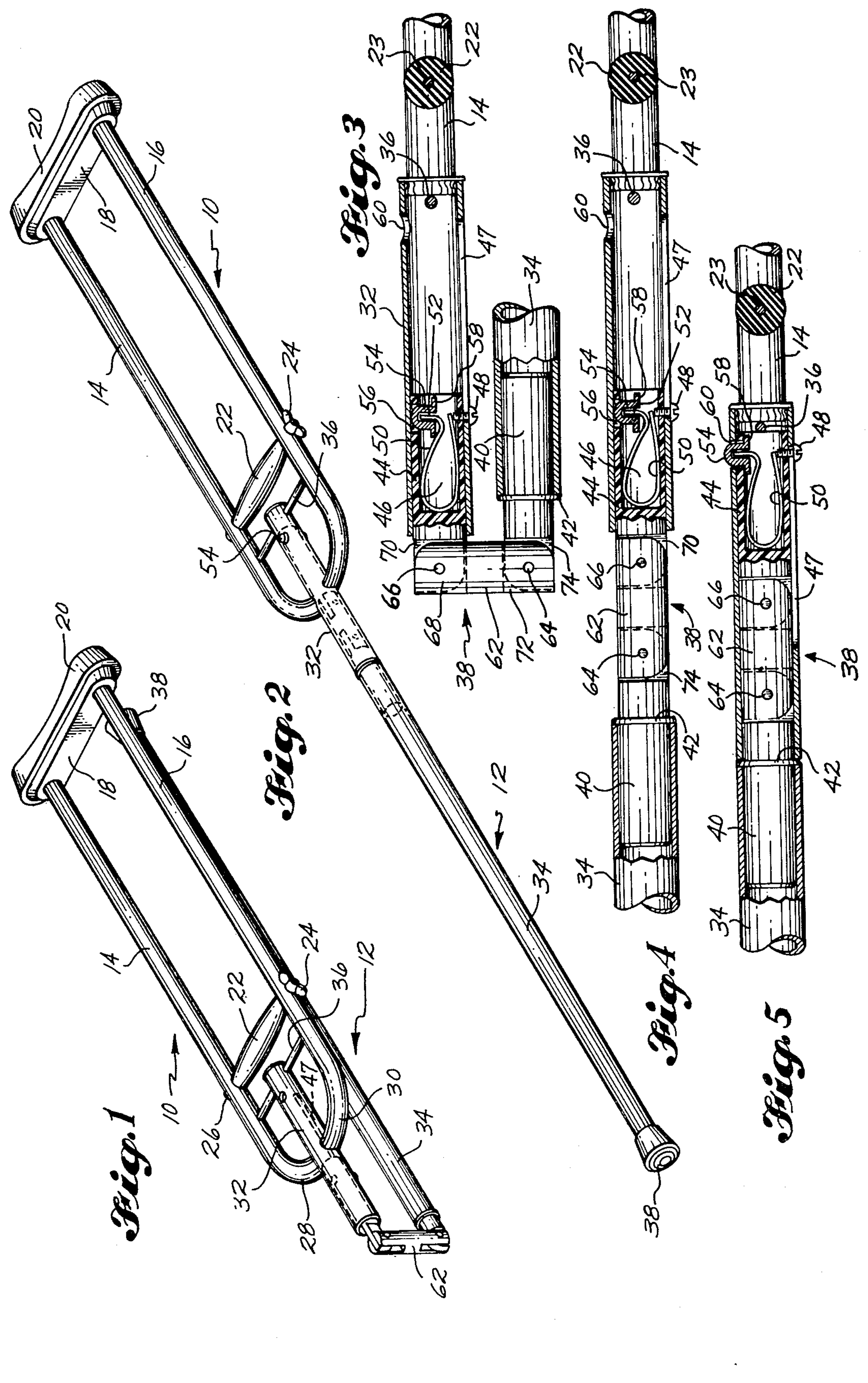
FIG. 1 is an isometric view of a folding crutch shown in its folded position.
FIG. 2 is an isometric view of the crutch in its use position.
FIG. 3 is an enlarged scale fragmentary view of the connector means between the two sections of the crutch, with some parts shown in side elevation and other parts shown in longitudinal section, with the components of the connector means being shown in the position which they occupy when the crutch is folded.
FIG. 4 is a view similar to FIG. 3, but showing the components of the connector means aligned preparatory to movement of the crutch into its use position.
FIG. 5 is a view like FIGS. 3 and 4, but showing the components of the connector means in the position in which they occupy when the crutch is in its use position.

Referring first to FIGS. 1 and 2, the particular folding crutch which is illustrated comprises an upper section 10 and a lower section 12. Preferably, but not necessarily, the sections 10, 12 are approximately equal in length so that the folded length of the crutch is at a minimum.

The upper section 10 may comprise first and second spaced apart stiles 14, 16, connected together at their upper ends by an underarm rest 18. The underarm rest 18 may be constructed from wood or plastic, and may be provided with a foam rubber or foam plastic pad 20.

A handle 22 is interconnected between the stiles 14, 16 at an appropriate location below the underarm rest 18. The handle body may be constructed from wood or plastic and may be secured lengthwise through the handle 22 and through opposed openings formed in the stiles 14, 16. The bolt may be secured in place by means of a nut 24 which, in the usual manner, threads onto the threaded end of the bolt 23 opposite its head 26. A wing nut 24 is illustrated. However, a flush head nut is preferred, but any suitable type of nut may be used.

The lower end portions 28, 30 of the stiles 14, 16 curve inwardly and join with an intermediate portion of a short tubular member 32 which constitutes an upper or minor portion of a third stile 34. The upper section 10 may include a cross brace 36 extending between the stiles 14, 16 and passing through openings formed in the upper end of tubular member 32.

The lower or major portion 34 of the third stile and a ground engaging pad or "tip" 38 at the lower end thereof together constitute the lower section 12 of the crutch.

As best shown in FIGS. 3-5 and 7, the upper and lower crutch sections 10, 12 are interconnected by a folding joint mechanism 38. This mechanism or connector means 38 serves to connect the upper and lower sections 10, 12 together in a manner permitting said sections 10, 12 to be moved between a use position in which the upper and lower sections are generally aligned and a folding position in which one section is adjacent the other section.

Connector means 38 comprises a first end piece 40 which is connected to the upper end of the lower portion 34 of the third stile. By way of typical and therefore non-limitative example, member 34 may be constructed from tubular material and member 40 may be sized to be snugly receivable within the tubular upper end portion of member 34. End member 40 includes a radial flange 42 which is an integral part of member 40 and which rests on the upper end of member 34. Flange 42 carries the weight that is placed on members 40 and 34 by the user and transfers such weight to the upper end of member 34.

Connector means 38 also comprises a second end piece 44 which is telescopically received within the tubular upper portion 32 of the third stile. As previously mentioned, end piece 40 is snugly received within the tubular end portion of member 34. It is bonded, riveted, heat shrunk, or otherwise firmly connected to the end portion of member 34. In contrast, end member 44 is sized to be snugly but slidably received within the upper portion 32 of the third stile.

A longitudinal slot 47 is provided in the sidewall of member 32. A pin member, shown in the form of a bolt 48, extends through the slot 47 and threads into a threaded opening provided in an upper end portion of end piece 44. The shank of pin 48 is narrower than the slot 47, but the head portion of pin 48 is wider than the slot 47.

As shown by FIG. 3, the pin 48 makes contact with the lower closed end of slot 47 and this arrangement stops or limits the outward telescopic movement of end piece 44. The engagement of pin 48 with slot 47 also prevents relative rotation between members 32 and 44.

As shown, member 44 has a cup-like upper portion which provides an upwardly opening socket 46. Socket 46 houses a leaf spring 50, the bight portion of which faces downwardly of the crutch or inwardly of the socket 46. The end portion 52 of one leg of spring 50 is bent so that it extends generally laterally of member 32. End member 52 extends into a socket provided in a button 54. The main body of button 54 is aligned with a sidewall opening 56 provided in member 44. Button 54 includes a flange 58 which is sized larger than the opening 56, so that the button cannot be moved entirely through the opening 56. The body portion of button 54 is smaller than the opening 56 so that it can pass through the opening 56.

Member 32 is also provided with a sidewall opening 60, located near the upper end of member 32.

As shown in FIG. 5 of the drawing, when the crutch is in its use position the body of button 54 extends through both of openings 56, 60. The leaf spring 50 holds it in such openings 56, 60 and the flange 58 prevents spring 50 from urging it entirely through the openings 56, 60. As can be appreciated, as long as the body portion of button 54 is located within both openings 56, 60, member 44 is locked in position relative to member 32, and such members cannot be moved telescopically.

Figures 6, 7:
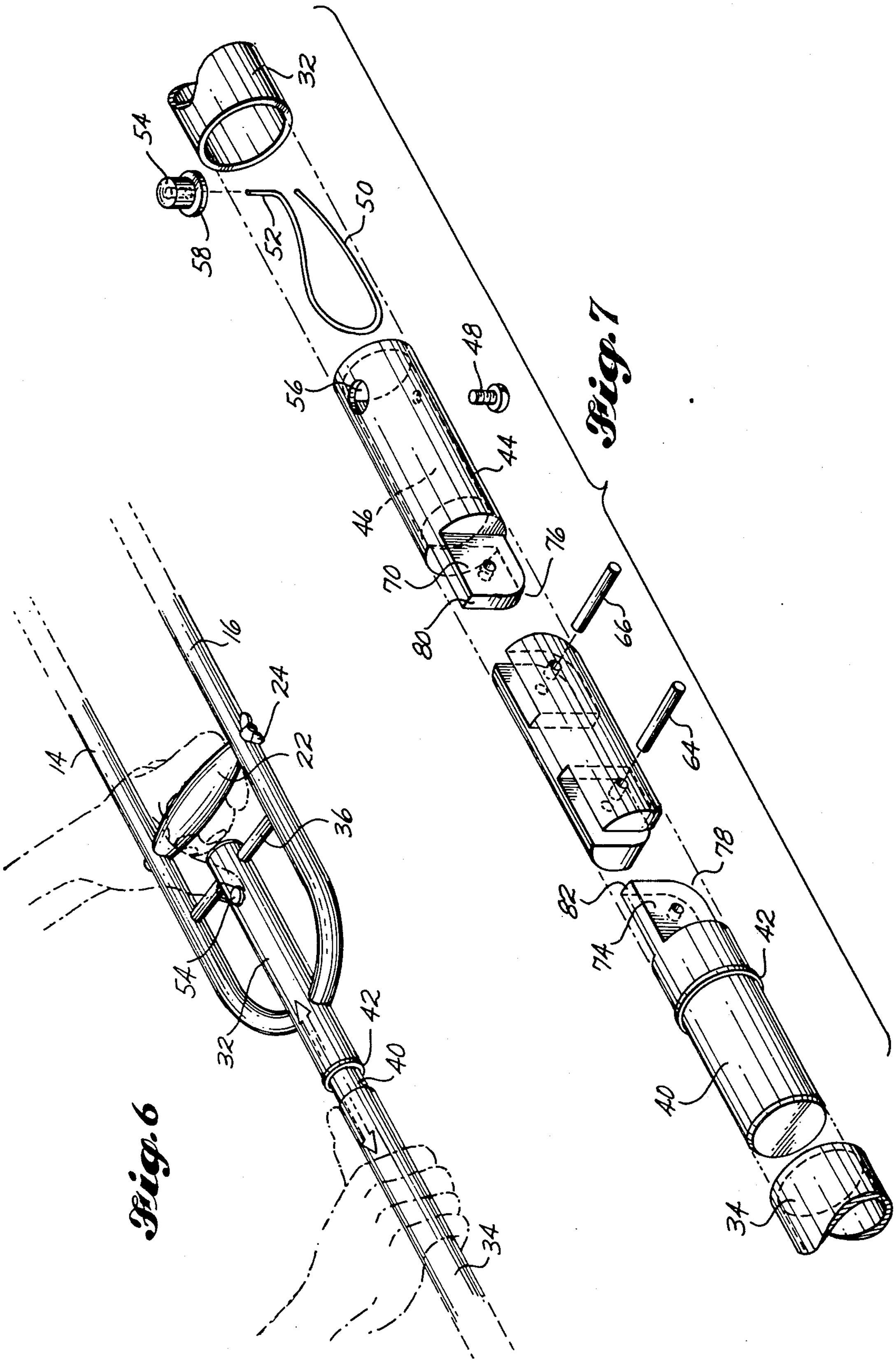
FIG. 6 is a fragmentary isometric view of a mid-portion of the crutch, showing the hand of a user in the process of unlocking the sections and starting the folding operations.
FIG. 7 is an exploded isometric view of the components of the connector means.
Figure 8:
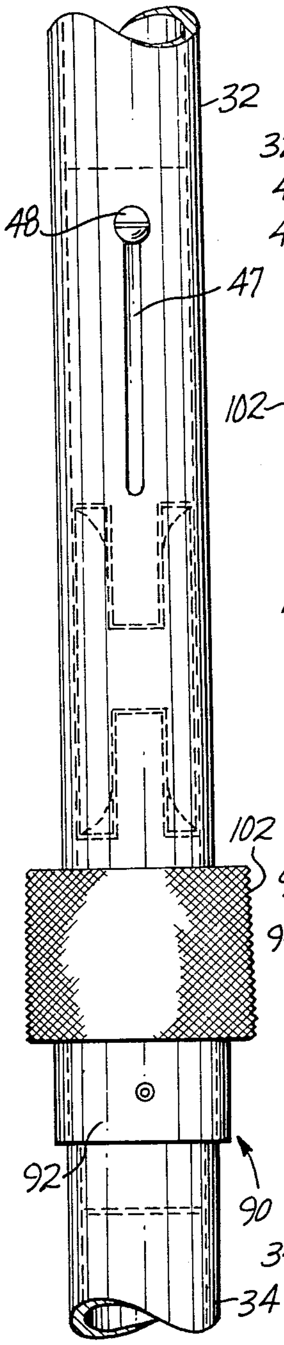
FIG. 8 is a fragmentary elevational view of the joint region of the crutch, showing the cam ring in threaded engagement with the threaded base portion of the the collet.

Connector means 38 also includes a link 62, a first pivot pin 66 which pivotally connects the upper end 68 of link 62 with the lower end 70 of member 44 and a second pivot pin 64 which pivotally connects the lower end 72 of link 62 with the upper end of 74 of end piece 40. As best shown by FIG. 7, end portion 68, 72 of link 62 may be slotted and the end portions 70, 74 of members 44, 40 may be configured to fit within the slots, so as to form "knuckle" type joints. End members 70, 74 may be termed "tongues". As shown by FIG. 7, tongues 70, 74 may be generally square ended but including one round corner 76, 78, enabling end pieces 44, 40 to be pivotally moved or swung in one direction only. The square corners 80, 82 provided opposite the rounded corners 76, 78 make contact with the flat bottom surfaces of the slots to prevent folding movement in the opposite direction. This feature is included to facilitate alignment of the end members 40, 44 with the link 62 when it is desired to unfold the crutch and telescopically move end piece 44, link 62 and the upper portion of end piece 40 into the interior of tubular member 32 (FIG. 5).

Preferably, the handle 22 is located in close enough proximity to the button 54 that a user can grasp the handle 22 with one hand and the thumb of such hand will be positionable on the bottom 54 (FIG. 6). This arrangement enables the user to grasp the handle 22 with one of his hands (e.g. his left hand) while grasping the second section 12 with his other hand. Then, he only has to push down on button 54 by use of the thumb on this hand which is on the handle 22 and pull the two sections apart, to move the connector components from the confines of tubular member 32. Once the link 62 and end member 70, 74 are exposed, the crutch can be folded into the configuration shown by FIGS. 1 and 3.

In preferred form the folding crutch of this invention is constructed from light weight aluminum or light weight metal alloy tubing. The members 40, 44, 62 can be manufactured from a strong structural plastic, such as nylon, or can be constructed from a suitable metal material.

As shown by FIGS. 8-11, the folding crutch of the present invention has the same basic construction as the crutch described above in connection with FIGS. 1-7, but in addition it comprises a mechanism for tightening and reinforcing the joint region 38'.

The joint locking and reinforcing apparatus comprises a collet member 90 having a shank portion 92 which is riveted or otherwise suitably fastened to the member 34. The opposite end of member 90 includes axial slots 94 dividing such end portion 96 into a plurality of circumferentially spaced apart jaws. The outer end portions of the jaws 96 are sloped at 98.

An externally threaded portion 100 is located axially between shank 92 and jaw portion 96.

A cam ring 102 is slidably mountable in the region above member 90. Cam ring 102 may include a knurled outer surface for the purpose of giving the user a good grip. It includes a set of internal threads 104 at its end adjacent the member 90. The opposite end includes an internal camming surface 106.

Figure 9:
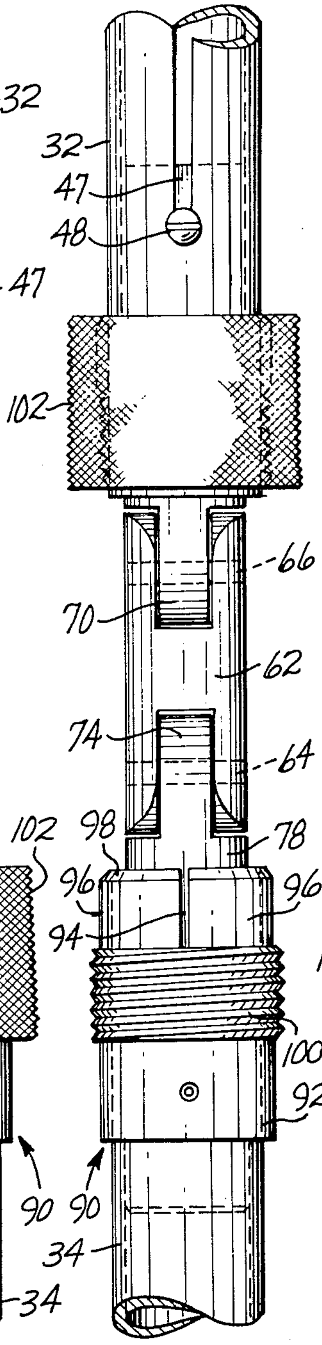
FIG. 9 is a view like FIG. 8, but showing the cam ring detached and spaced axially from the collet, and showing the upper and lower components of the crutch moved partially apart.
Figure 10:
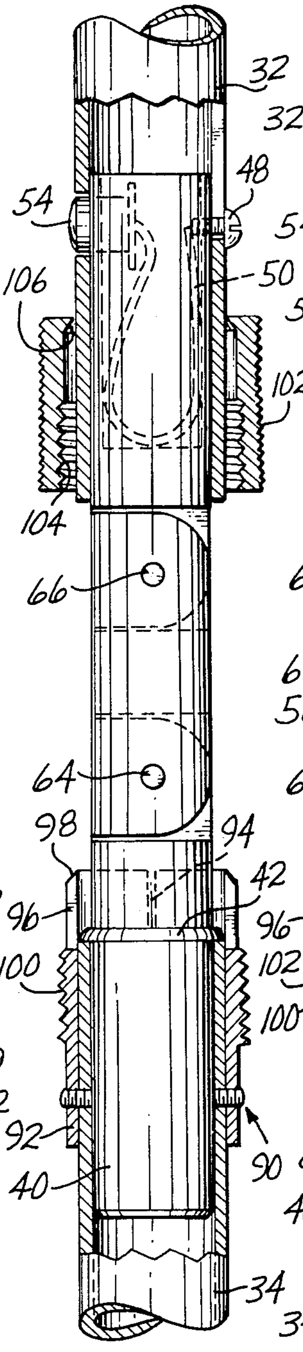
FIG. 10 is a view like FIG. 4, but of a crutch mechanism of the present invention.
Figure 11:
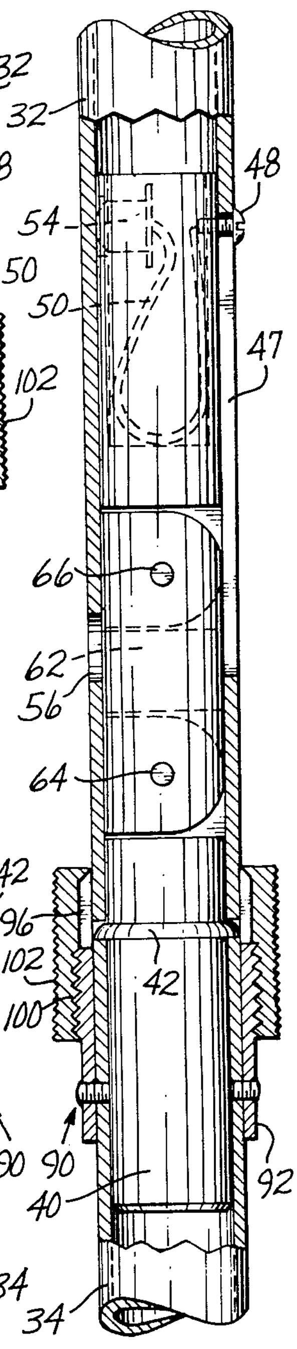
FIG. 11 is a view like FIG. 5, but of a crutch including an embodiment of the joint tightening and reinforcing of the present invention.

When the cam ring 102 is separated from the member 90, as shown in FIGS. 9 and 10, the joint mechanism can be operated in the manner described above in connection with FIGS. 1–7.

When the two sections of the crutch or other device are telescopically apart, an annular space is defined radially inwardly of the collet jaws and axially outwardly of the upper end of the lower stile. When the upper and lower sections are brought telescopically together, the tubular lower end portion of the upper section slides into and is snugly received within this annular space. Then, when the cam ring 102 is screwed onto the collet member 90 and tightened, the cam surface 106 exerts a laterally inwardly directed force on the sloping surfaces at the upper ends of the collet jaws 96, forcing such collet jaws 96 radially inwardly, into squeezing contact with the outer surface of the lower end portion of the upper section. This results in a reinforcement of the joint so that relative angular movement does not occur between the two sections, or at least is minimized. In a crutch, it results in the user feeling essentially no movement at the joint as he alternately places his weight onto and removes it from the crutch. The movement arresting bracing action provided by the cam ring and the collet member also substantially eliminates any sound at the joint during use of the crutches. Without the mechanism 92, 102, some movement will be felt by the user and will also result in a "clicking" noise which might be disturbing to the user. The telescopic fit of the lower portion of member 32 within the jaw portion of the collet ring 92, and the tight frictional grip of the jaws 96 with member 32 makes the joint stiff and quiet.

I claim:

1. In a folding structure, comprising:

first and second sections, each including an end portion, wherein at least the end portion of the second section is tubular;

connector means for connecting the two sections together in a manner permitting said sections to be moved between a first position in which the two sections are generally aligned with each other and a folded position in which each section is adjacent the other section, said connector means comprising a first end piece connected to the end portion of the first section, a second end piece which is telescopically received within the tubular end portion of the second section, a link position between said first and second end pieces, pivot pin means connecting the ends of the link to said end pieces in a manner permitting said end pieces, and the first and second sections connected thereto, to be pivotally moved between a first position in which they are axially aligned with the link and a second position in which they are both substantially perpendicular to the link and adjacent one another, stop means for preventing telescopic movement of the second end piece completely outfrom the tubular end portion of the second section, and releasable lock means carried by said second end piece and engagable with the tubular end portion of the second section for locking the two sections together in said use position, said lock means including a depressible lock button; and a joint tightening and reinforcing mechanism, comprising a collet member attached to the end portion of the first section and including a plurality of collet jaws which extend axially endwise beyond the end of the end portion of said first section, and external threads on the collet member axially inwardly of the collet jaws, and a cam ring which is slidably mounted on the tubular end portion of the second section, and which includes an internally threaded end portion, adapted for mating engagement with the external threads on the collet member, and a cam portion spaced axially inwardly of the threaded portion, whereby when the two sections are telescopically together and axially aligned, and the cam ring is screwed onto the collet member, its cam section exerts a radially inwardly directed squeezing force on the collet jaws, bringing them into tight frictional engagement with the tubular end portion of the upper section, so as to, in that manner, structurally reinforce and tighten the joint between the two sections.

2. In a folding crutch structure, comprising:

first and second sections of a load carrying stile, each including an end portion, wherein at least the end portion of the second section is tubular;

connector means for connecting the two sections together in a manner permitting said sections to be moved between a first position in which the two sections are generally aligned with each other and a folded position in which each section is adjacent the other section, said connector means comprising a first end piece connected to the end portion of the first section, a second end piece which is telescopically received within the tubular end portion of the second section, a link position between said first and second end pieces, pivot pin means connecting the ends of the link to said end pieces in a manner permitting said end pieces, and the first and second sections connected thereto, to be pivotally moved between a first position in which they are axially aligned with the link and a second position in which they are both substantially perpendicular to the link and adjacent one another, stop means for preventing telescopic movement of the second end piece completely outfrom the tubular end portion of the second section, and releasable lock means carried by said second end piece and engagable with the tubular end portion of the second section for locking the two sections together in said use position, said lock means including a depressible lock button; and a joint tightening and reinforcing mechanism, comprising a collet member attached to the end portion of the first section and including a plurality of collet jaws which extend axially endwise beyond the end of the end portion of said first section, and external threads on the collet member axially inwardly of the collet jaws, and a cam ring which is slidably mounted on the tubular end portion of the second section, and which includes an internally threaded end portion, adapted for mating engagement with the external threads on the collet member, and a cam portion spaced axially inwardly of the threaded portion, whereby when the two sections are telescopically together and axially aligned, and the cam ring is screwed onto the collet member, its cam section exerts a radially inwardly directed squeezing force on the collet jaws, bringing them into tight frictional engagement with the tubular end portion of the upper section, so as to, in that manner, structurally reinforce and tighten the joint between the two sections.

3. A folding crutch according to claim 2, wherein the first and second sections make force transmitting abutting connection at their ends when in the use position.

* * * * *